United States Patent [19]

Lyall

[11] Patent Number: 4,635,972
[45] Date of Patent: Jan. 13, 1987

[54] PLASTIC PIPE COUPLING APPARATUS AND METHOD OF USING SAME

[75] Inventor: Robert W. Lyall, Huntington Beach, Calif.

[73] Assignee: R. W. Lyall & Company, Inc., Santa Fe Springs, Calif.

[21] Appl. No.: 732,932

[22] Filed: May 13, 1985

[51] Int. Cl.[4] .............................................. F16L 47/00
[52] U.S. Cl. .................... 285/242; 285/256; 285/397; 285/417; 285/423; 285/55
[58] Field of Search .............. 285/242, 259, 239, 256, 285/397, 417, 55, 423

[56] References Cited

U.S. PATENT DOCUMENTS

| 2,319,024 | 5/1943 | Wehringer | 285/259 X |
| 2,805,088 | 9/1957 | Cline et al. | 285/259 X |
| 3,315,986 | 4/1967 | Quick | 285/242 X |
| 3,408,099 | 10/1968 | Appleton | 285/259 X |
| 4,293,147 | 10/1981 | Metcalfe et al. | 285/242 X |
| 4,392,678 | 7/1983 | Adamazyk | 285/259 X |
| 4,489,961 | 12/1984 | Laidig | 285/242 X |

FOREIGN PATENT DOCUMENTS

| 921006 | 12/1954 | Fed. Rep. of Germany | 285/242 |
| 376410 | 3/1940 | Italy | 285/239 |
| 74732 | 3/1949 | Norway | 285/239 |
| 138791 | 7/1949 | United Kingdom | 285/242 |
| 808984 | 2/1959 | United Kingdom | 285/242 |
| 1310367 | 3/1973 | United Kingdom | 285/242 |

Primary Examiner—Richard J. Scanlan, Jr.
Attorney, Agent, or Firm—Fulwider, Patton, Rieber, Lee & Utecht

[57] ABSTRACT

A fitting formed with a circular flange formed coaxially with a spigot which is formed along its length with a series of frusto-conically shaped, axially spaced apart, sealing rings which are formed at their enlarged ends with respective annular holding rings. A metallic stiffener tube is received telescopically in the fitting to provide support against radial inward collapse thereof. The spigot may be formed adjacent the flange with an enlarged in diameter centering shoulder and may be formed at its extremity remote from the flange with a reduced in diameter stress relief nipple. A finishing sleeve is provided for telescopical receipt over a polyethelene pipe fitted over the spigot. Thus the spigot may be inserted into the end of the plastic pipe to expand such pipe to an expanded configuration. The finishing sleeve may then be drawn telescopically over the expanded configuration to press the wall of the polyethelene pipe radially inwardly to compress the polyethelene material between the stiffener tube and finishing collar to flow the pipe wall material radially inwardly into the grooves formed between adjacent ones of the sealing rings to thereby form a plastic coupling completely surrounding the metal stiffener tube to isolate it from soil in which the pipe might be buried. The method includes the steps of severing a leaking section from a plastic pipe and inserting such a double ended fitting as a substitute for the severed section.

21 Claims, 11 Drawing Figures

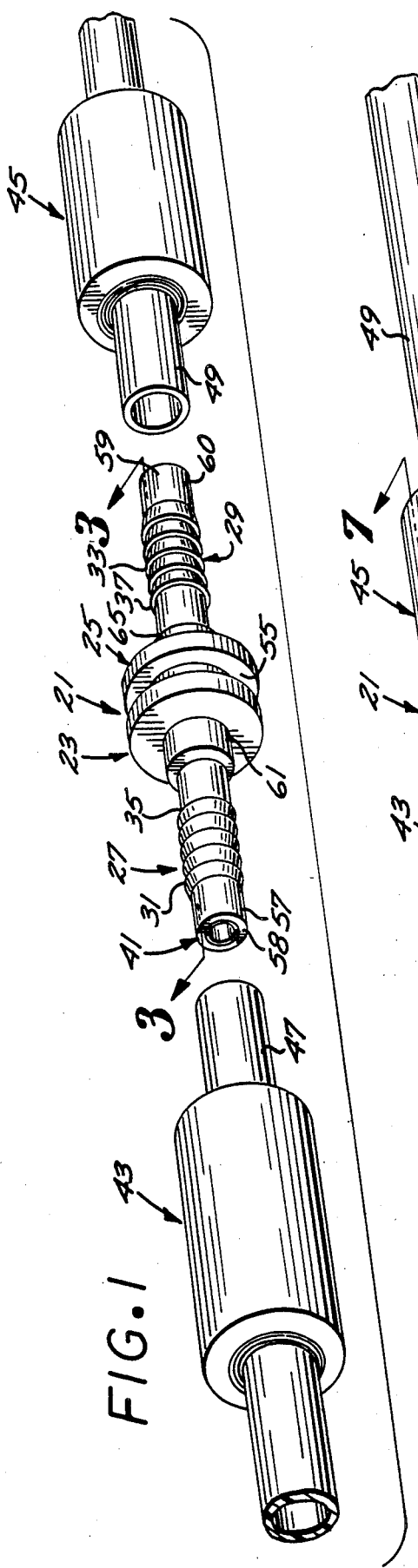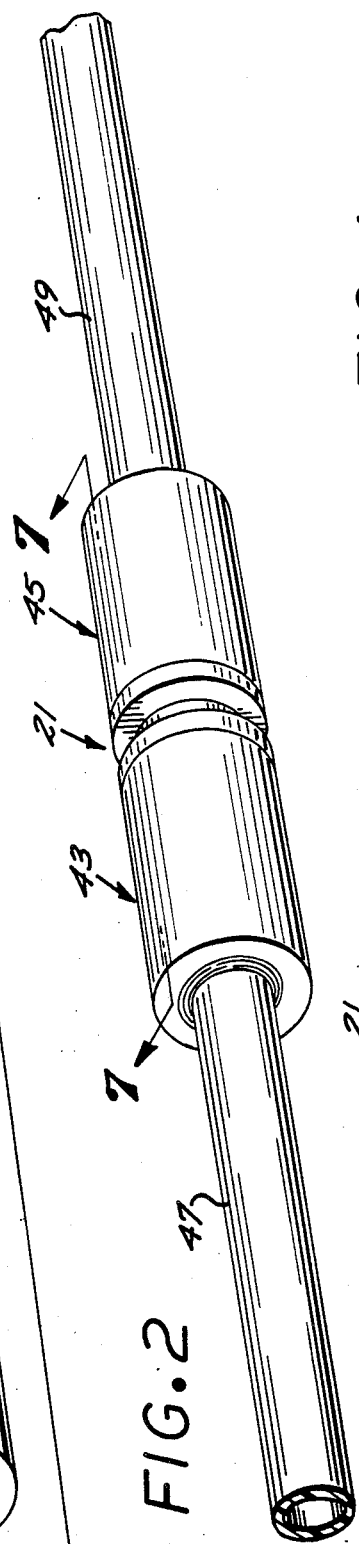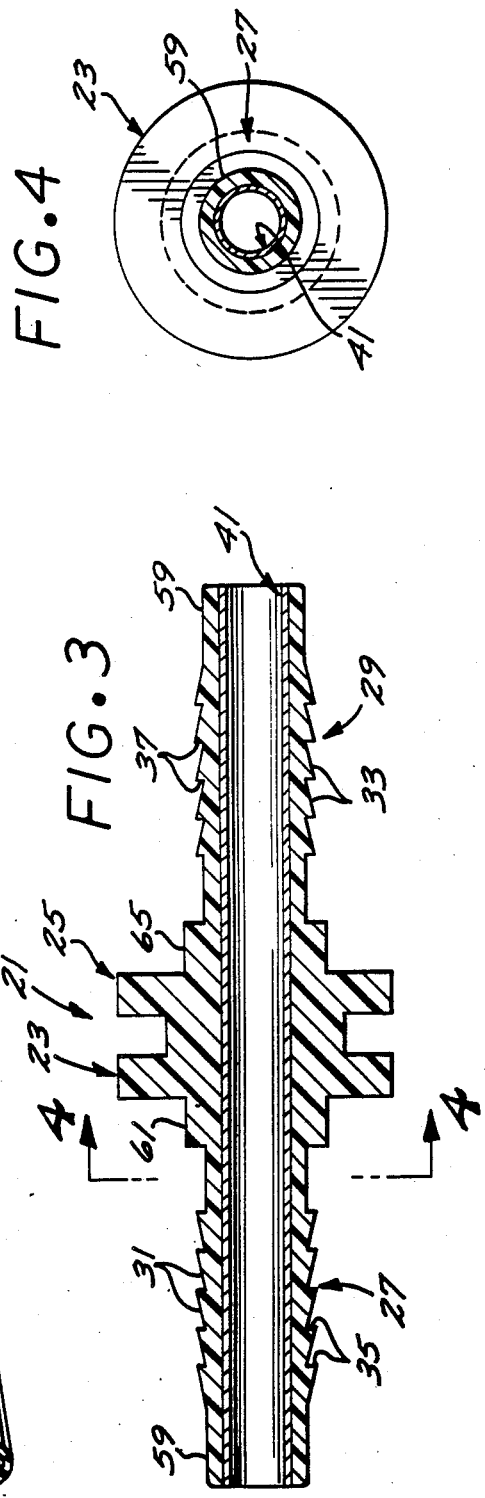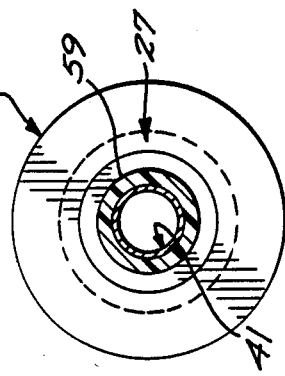

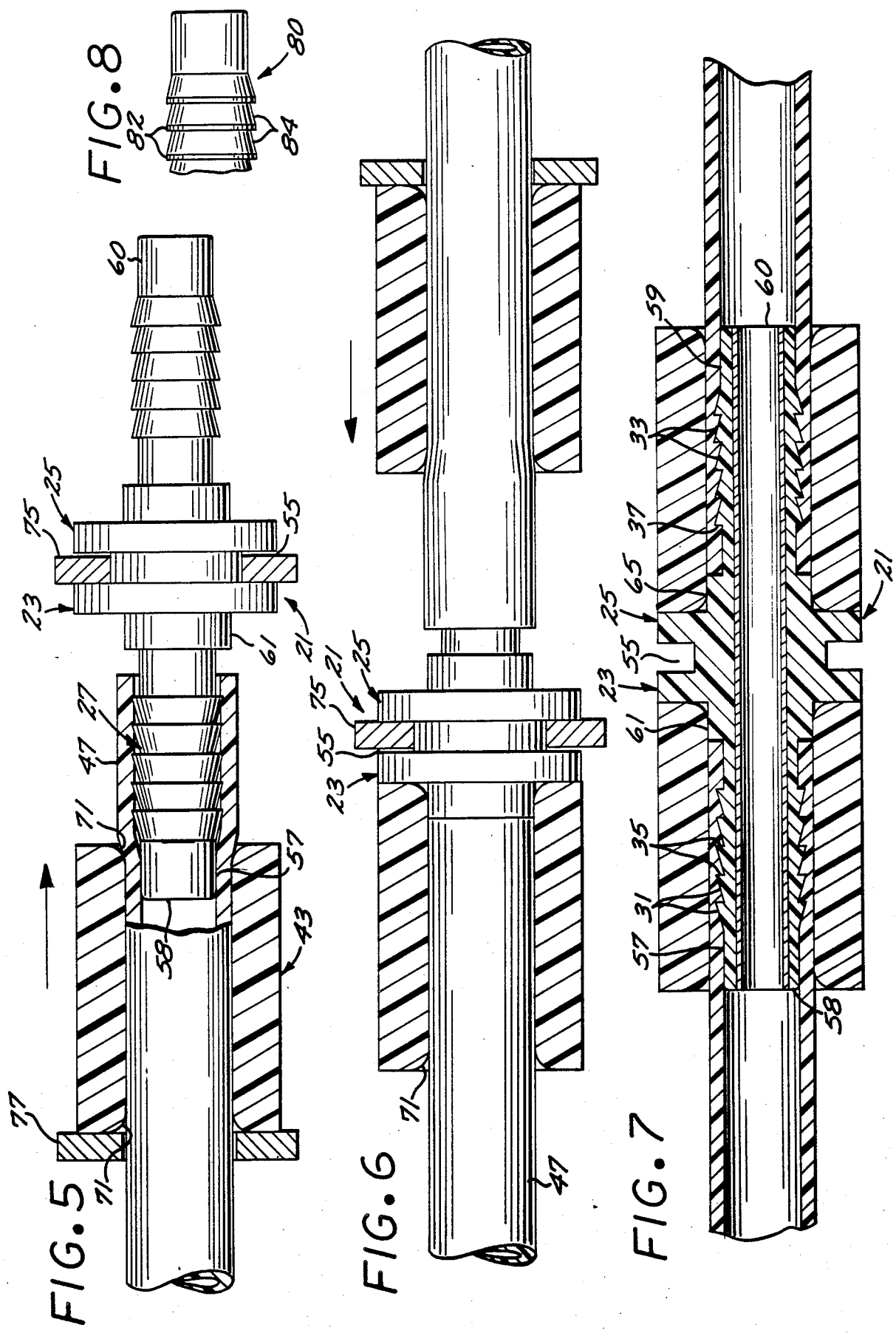

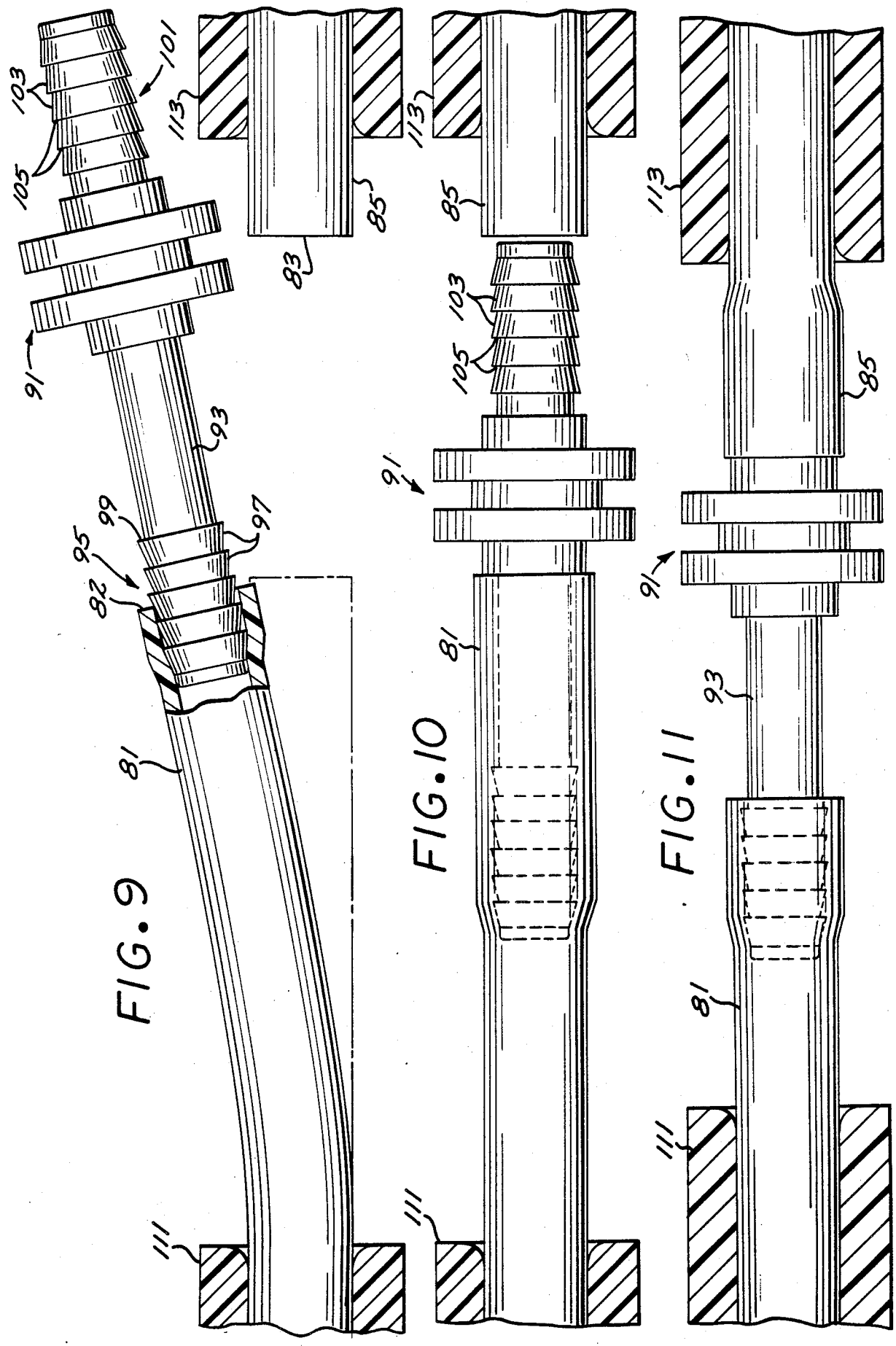

PLASTIC PIPE COUPLING APPARATUS AND METHOD OF USING SAME

BACKGROUND OF THE INVENTION

1. Field of the Invention

The plastic pipe coupling apparatus and method of the present invention relates to couplings for fastening plastic pipes together without necessity of forming coupling threads in the pipe or incurring the disadvantages attendent direct contact between metallic fittings and corrosive elements, such as soil into which a coupled pipe might be buried.

2. Description of the Prior Art

It is well known in the art that plastic pipe, such as polyethelene, has become a popular conduit for underground transmission of natural gas. As use of such polyethelene pipe has become more and more popular in industry, the necessity of perfecting a coupling method has become apparent. In response to that demand, numerous different coupling procedures have been proposed. Some coupling procedures contemplate the actual fusion of the plastic pipe to form a gas tight coupling. Other devices have been proposed which contemplate use of telescopically interfitting parts having dynamic seals, such as O-rings, interposed therebetween.

Representative of some of the efforts to provide a satisfactory plastic pipe coupling is the polyester fittings formed with a tubular body having coupling members bonded to the opposite ends thereof with one such coupling member being formed with interior seals which seal dynamically with a tube received telescopically within the tubular body. A device of this type is shown in U.S. Pat. No. 4,023,831. Devices of this type, however, suffer the shortcoming that the seals are exposed directly to the telescopical tube and to any foreign matter, dirt or debris which may be carried on such tubes. Moreover, the seals, after long years of use, tend to cold flow out of their retaining glands thus breaking the sealing engagement with the pipe.

A dynamic plastic pipe coupling is shown in U.S. Pat. No. 4,386,796 issued on the application of applicant Robert W. Lyall and Donald C. Hill. This coupling, while being satisfactory for underground repair work, does suffer the shortcoming that it incorporates dynamic seals, requires heat fusion and some technical competency to properly install the coupling.

It has been thought by those skilled in the art that an economical plastic fitting could not be formed by mere axial sliding of a completion sleeve onto a fitting to compress the wall of the plastic pipe into grooves formed in a plastic spigot. Metal to plastic connections have been proposed which include metal inserts for insertion into the end of a plastic pipe and over which a metal finishing sleeve might be drawn to compress the wall of the pipe radially inwardly into annular, flat bottom, grooves formed in the exterior wall of an insert. A device of this type is shown in U.S. Pat. No. 4,293,147. Such devices, while satisfactory for their intended purposes, suffer the shortcoming that they incorporate metal sleeves and flanges which, when the pipe is buried, create an electrolytic circuit which severely attacks the metal fitting and sleeve.

Other devices have been proposed which incorporate double ended spigots having a profile which is somewhat saw tooth shaped for insertion into a thermo-plastic pipe and over which a shrinkable sleeve may be received for shrinkage onto the pipe to compress it against the grooves formed in the spigot. A device of this type is shown in Australian Pat. No. 220,055. Devices of this type have proven unsatisfactory for certain applications where heat services are not readily available for expanding the shrinkable sleeve or where sleeves having sufficient shrinkage characteristics are not readily available.

Other devices for coupling hoses to nipples, include a single conically shaped nipple received in the free end of a hose and having a sleeve drawn thereover to compress the hose between the sleeve and nipple. A device of this type is shown in U.S. Pat. No. 2,821,775. While satisfactory for its intended purpose, such a coupling would not be satis factory for subterranean plastic natural gas pipes.

SUMMARY OF THE INVENTON

The plastic pipe coupling apparatus of the present invention is characterized by a plastic fitting formed with an enlarged in diameter flange having projecting axially therefrom a spigot which has formed in the exterior peripheral wall thereof a series of axially spaced, conically shaped, sealing rings which are formed at their respective bases with annular holding faces and cooperate with one another to form grooves which are somewhat saw tooth shaped in cross-section. A plastic finishing sleeve is provided for telescopical receipt on a plastic pipe prior to connection with the nipple. The diameter of the spigot is greater than the interior diameter of the pipe to thus cause the conical sealing rings to stretch the pipe to a radially expanded configuration. The interior of the finishing sleeve is formed with a diameter less than that of the expanded exterior of the pipe such that drawing of the sleeve onto the pipe, as expanded by the spigot, results in the wall of the plastic pipe being compressed radially inwardly into the grooves formed between the sealing rings to thereby maintain positive sealing engagement between the pipe and spigot. In the method such a coupling formed with oppositely disposed spigots is employed to replace a faulty section of a plastic pipe which has been removed.

Other objects and features of the invention will become apparent from consideration of the following description taken in connection with the accompanying drawings.

BRIEF DESCRIPTION OF THE DRAWINGS

FIG. 1 is a perspective view of a double ended plastic pipe coupling apparatus incorporating the present invention and depicting such apparatus ready for assembly;

FIG. 2 is a perspective view similar to FIG. 1 but showing the coupling apparatus assembled;

FIG. 3 is a longitudinal sectional view, in enlarged scale, taken along the line 3—3 of FIG. 1;

FIG. 4 is transverse sectional view taken along the line 4—4 of FIG. 3;

FIG. 5 is an elevational view, in enlarged scale and partially in section, of the coupling apparatus shown in FIG. 1, and depicting the apparatus being assembled;

FIG. 6 is an elevational view similar to FIG. 5, partially in section, and depicting the apparatus as assembly thereof as assembly is being completed;

FIG. 7 is a longitudinal sectional view of the coupling apparatus shown in FIG. 5 but showing the apparatus fully assembled;

FIG. 8 is a broken elevational view of a second embodiment of the coupling apparatus of the present invention;

FIG. 9 is a longitudinal elevational view, partially in section, of a third embodiment of the coupling apparatus of the present invention, incorporating a repair coupling and depicting the coupling as assembly is commenced;

FIG. 10 is an elevational view similar to FIG. 9 but showing the plastic pipe coupling apparatus partially assembled; and FIG. 11 is a elevational view, partially in section, similar to FIG. 9 but showing assembly progressed even further toward final completion.

DESCRIPTION OF THE PREFERRED EMBODIMENTS

Referring to FIGS. 1, 5 and 7, the plastic pipe coupling apparatus includes, generally, a plastic fitting 21 which may be double ended and, in which case, includes a pair of axially spaced apart circular flanges 23 and 25, as well as oppositely extending spigots 27 and 29. The exterior of such spigots 27 and 29 are formed with frustoconically shaped annular sealing rings 31 and 33 which terminate at their enlarged ends in axially facing annular locking faces 35 and 37. Received telescopically within the fitting 21 is a metallic support tube, generally designated 41. Plastic finishing sleeves, generally designated 43 and 45 are telescopically received on plastic pipes 47 and 49. Thus, the ends of such pipes may be inserted over the ends of the spigots 27 and 29 as shown in FIGS. 5-7 and the finishing sleeves 43 and 45 drawn into position to compress the walls of the respective plastic tubes 47 and 49 radially inwardly to cause the plastic at the interior cold flow radially inwardly to fill the grooves formed between the respective locking rings 31 and 33 as shown in FIG. 7.

While the coupling of the present invention may be employed to couple a plastic pipe to any device which might incorporate a spigot, the preferred embodiment disclosed here contemplates joining a pair of pipe sections together. Referring to FIG. 1, the occasion frequently arises where polyethelene pipes 47 and 49 on the order of 1 ⅛ inch outside diameter (OD) and ⅞ inch inside diameter (ID) are to be coupled together. In many instances, particularly in field applications, heat sources and related facilities are not readily available for conveniently fusing the pipe sections together. Consequently, there exists a demand for a plastic coupling apparatus which may be conveniently utilized by relatively unskilled personnel to join the pipe sections 47 and 49 together. To this end, applicant has provided a plastic fitting 21 which is somewhat tubular in configuration and is double ended to form the two oppositely directed spigots 27 and 29, one being the mirror image of the other. The fitting 21 is constructed of a high impact plastic such as a polyester resin sold by General Electric Company under the designation Xenoy 6620. The flanges 23 and 25 are somewhat spool shaped to form therebetween a reduced in diameter tool access groove 55.

The spigots 27 and 29 are formed on the distal extremities with stress relief nipples, 57 and 59, respectively, terminating in respective ends 58 and 60 and having a diameter of 0.430 inches to thus slip fit into the open ends of the pipes 47 and 49. The frusto-conical sealing rings 31 and 33 taper radially outwardly from a minor diameter to a major diameter of about 0.490 inches to thereby cooperate together in forming an overall configuration sufficient to, when the spigot 27 is inserted, expand the pipe 47 radially outwardly to an expanded bell-like configuration as shown in FIG. 5. The spigots are formed at their proximate ends with respective centering lands 61 and 65 having respective diameters of about 0.630 inches to slip fit into the interior diameters of the respective finishing sleeves 43 and 45.

The metallic support tube 41 is preferably constructed of aluminum having a 5/16 inch OD and 0.028 inch wall thickness to thereby provide sufficient structural stiffness to withstand the compressive forces applied to the spigots 27 and 29. The tube 41 is press fit into a longitudinal bore formed in the fitting 21.

The finishing sleeves 43 and 45 are also preferably formed of high impact plastic, such as polyester sold by General Electric under the trademark Xenoy 6620 and have inside diameters which are sufficiently small to cooperate with the outside contour of the spigots as defined by the sealing rings 33 to form an annulas having a radial dimension which is sufficiently small to compress therein the walls of the tubes 47 and 49 as depicted in FIG. 7 to form a positive mechanical lock and gas impermeable seal. For a tubular construction employing Xenoy 6620, it has been determined that for a finishing sleeve having an ID of about 1.125 inches, an external diameter of 1.275 inches forms a sufficiently thick sleeve wall to withstand the forces necessary for adequate application of compression to conventional polyethelene pipe. The opposite ends of the sleeves at the interior diameters are formed with 1/16 inch radius 71 to thus render such sleeves reversible and afford a glide surface to facilitate forcing of such sleeves onto the expanded tubes as shown in FIG. 5.

In practice, it has been discovered that forming of the larger diameter sleeves for pipe on the order of two inches in diameter, casting thereof is facilitated by forming such sleeves with relatively thin tubular walls formed integral with circumferential ribs or hoops which add strenth while not contributing substantially to the mass thereof, a factor which serves to contribute to more uniform cooling of the entire mass of the casted part to thereby eliminate formation of unwanted pores which will produce a sleeve having a high degree of porosity.

It will be appreciated that a desired number of sets of fittings 21 and mating sleeves 43 and 45 are typically carried as an assembly by the workmen for ready use in coupling plastic pipe sections together. Consequently, when pipe sections, such as 47 and 49 are to be coupled together, they may be squared off on their confronting ends and the sleeves 43 and 45 telescoped freely over the ends thereof and slid a distance from the pipe end exceeding the length of the sleeves 43 and 45. One spigot, such as 27, may then be inserted in the end of the pipe 47 as shown in FIG. 7. This, in effect, expands the interior of the plastic pipe over the conically shaped sealing rings 31 and causes the pipe itself to assume the shape of an expanded cylinder. The sleeve 43, which has been previously telescoped onto the pipe 47, may then be drawn into compressive relationship over the expanded pipe surrounding the spigot 27.

It has been found that a convenient device for installing the coupling of the present invention is a clamping element having one pair of forks which may have its tines 75 inserted in straddling relationship into the tool-receiving groove 55 of the fitting 21 (FIG. 5). A second fork having its tines 77 inserted in straddling relationship over the pipe 47 and such forks then drawn axially together to urge the sleeve 43 onto the expanded section of the pipe 47 surrounding the spigot 27. As the sleeve 43 is drawn axially over such expanded pipe section, the radius 71 of the leading end thereof will facilitate compression of the pipe wall, as well as travel therealong, until such time as it registers with the centering shoulder 61. Continued pressing of the sleeve 43 on the pipe 47 will cause the sleeve 43 to ride onto the land 61 and abut against the confronting face of the flange 23 as shown in FIG. 6. Such centering and abutment will provide a certain degree of mechanical rigidity between the fitting 21 and sleeve 43 to thereby maintain the plastic pipe 47 centered on the spigot 27 throughout the length thereof. Likewise, it will be appreciated that the sleeve 43 affords support for the plastic pipe 47 throughout the entire length of the spigot 27. A tool which has been found useful for making this completion is a tool marketed by the assignee of this patent, R. W. Lyall & Company, Inc., 9837 Pioneer Blvd., Santa Fe Springs, Caif., under the trademark LYCOFIT.

Referring to FIG. 7, it will be appreciated that, as the sleeve 43 is drawn into sealing position, the wall of the plastic pipe 47 is compressed radially inwardly to be pressed directly into the grooves formed in the axial area between the respective sealing rings 31 to form radially inwardly projecting annular ridges having a saw tooth shape in cross section to engage behind each of the axially facing annular locking faces 35. As the sleeve 43 compresses the plastic of the wall of the pipe 47 to conform to the general shape of the saw tooth shaped rings 31, the crowns, or sharp edges, formed at the major diameter of such rings is commonly somewhat distorted to slightly flatten at the crown. It has been found that such flattening does not detract significantly from the efficiency of the seal and integrity of the connection. In fact, such flattening of the crown of such rings 31 has proven to actually detract from the magnitude of stress risers that would otherwise be built up in the wall of the pipe 47 as a result of sharp crowns.

While compressive stresses are built up in the pipe 47 during radial compression thereof, the annulas formed between the cylindrical nipple 59 and interior of the sleeve 43, not compressing such pipe, will serve to relieve such stresses in the pipe before the end 50 of the spigot is reached. This relief of stress in the pipe 47 at the end 58 of the spigot serves to substantially diminish the concentration of stresses that would otherwise exist in such pipe at the location corresponding with the end 58 of such spigot when bending forces are applied between such pipe and fitting 21.

Experience has proven that a 15%-19% compression of the thickness wall of the polyethylene pipe in a radial direction affords the degree of flowing of such polyethylene necessary to afford a positive and strong gas impermeable coupling exhibiting greater pull test characteristics than the parent pipe itself. Consequently, the plastic pipe 47 is securely coupled to the fitting 21 in a mechanically positive manner which provides support for such pipe throughout the entire length of the spigot 27 to thus prevent undue stress buildup in the pipe in the event laterally acting bending forces are applied to such pipe at a position remote from the fitting 21.

It will be appreciated that the second pipe 49 may be brought into position as shown in FIG. 6 telescoped over the spigot 29 in a manner similar to that described hereinabove with respect to the pipe 47. The sleeve 45 may then be drawn into position to mechanically lock the pipe 49 positively onto the spigot 29 to hold such pipe securely coupled to and centered with respect to the fitting 21 and consequently the pipe 47.

Subsequently, when the pipe is pressurized with, for instance, natural gas, the corrugations formed in the interior wall thereof and about the sealing rings 31 and 33 will effect a positive seal against seepage and will positively prevent disjoinder of the pipes in the event axial or lateral stress forces are applied thereto. In fact, the coupling has proven to be more than effective in meeting the minimum requirements of the U.S. Department of Transportation Code Section 192.283 for mechanical couplings. While this DOT requires a tensile elongation pull of 0.2 inches per minute, the subject coupling has been tested successfully at pull rates of between 10 and 30 inches per minute.

The coupling, generally desinged 80, shown in FIG. 8 is similar to that shown in FIGS. 1-7 except that the crowns 82 of the sealing rings 84 at the major diameter thereof have been flattened to form a blunt tooth arrangement as viewed in cross section. Such flattening of the crowns 82 has proven necessary in some of the larger diameter couplings, above 1¼ inch diameter, to prevent the sharp crowns at the outer diameters of the rings 82 from bending back under the stress of the coupled pipe being drawn in a pull test thereby resulting in the rings 82 loosing their gripping effect in holding the pipe secured to the coupling. This flattening of the crowns of the sealing teeth is particularly important for couplings which are intended to be employed to repair a damaged pipe already in place as described hereinafter with respect to FIGS. 9-12. As will be noted the method of repair disclosed contemplates one spigot of the fitting being inserted deep into one pipe end, the other spigot aligned with the other pipe end and the fitting then drawn toward such other pipe end thus necessitating partial withdrawal of the spigot from the first pipe end. With sharp crowns, the force required to overcome the resistance which such sharp rings present to such withdrawal is so great that the tensile strength of the pipe will be overcome before withdrawal is achieved thus resulting in elongation of the pipe.

Referring to FIGS. 9 and 11, the coupling of the present invention is particularly adaptable to repairing an underground pipe which has been damaged and a section removed therefrom to leave two confronting, axially spaced apart pipe sections 81 and 85 terminating in ends 82 and 83, respectively. Heretofore, leaks in underground plastic gas pipes had posed a serious problem since plastic pipes cannot be easily threaded and connected together in a leak free manner by threaded couplings. Fittings incorporating spigots formed with circumferential rings having rounded, square or trapozoidal cross sections had proven totally inadequate to serve as a coupling to join the ends of damaged plastic pipe.

However, with a repair coupling embodying the present invention it is possible to shut off the flow of, for instance, natural gas upstream of the leak, excavate in the area of the leak to expose the leaking pipe. For a plastic pipe having a 1⅛ inch O.D., for instance, the section in which the leak has occurred may then be simply removed by severing the pipe on both axial sides thereof to leave the exposed ends 82 and 83 disposed in confronting relationship spaced, for instance, three inches apart. To bridge the axial space left between the ends of such pipe sections 81 and 85, the repair coupling, generally designated 91 is formed with a pair of spaced apart flanges 90 and 92 which define therebetween a deep groove 94. Projecting in one axial direction from the flange 90 is an elongated tube section 93 which mounts a spigot section 95 on the remote end thereof. The spigot section 95 is formed on its periphery with axially spaced apart frusto-conical sealing rings 97 which terminate at the enlarged ends thereof in radial locking faces 99. The opposite end of the fitting 91 is formed with a similar spigot section, generally designated 101, which includes the frusto-conical sealing rings 103 terminating at the enlarged ends thereof in radial locking faces 105.

In operation, a damaged polyethelene pipe may be excavated along a, for instance, five foot length, and the leak resulting from such damage located. The section of pipe, for instance 3 inches in length, in which such leak is located may then be removed. Such removal will leave the pipe sections 81 and 85 terminating in the confronting spaced apart ends 82 and 83.

The repair coupling 91 has been found particularly effective in then joining the free ends 82 and 83 of the axially aligned pipe sections 81 and 85 thus accomplishing repair of the leak without expensive removal of the entire pipe system or undertaking excessive excavation efforts along long lengths of the pipe.

Insertion of the repair coupling 91 is similar to that described hereinabove with respect to FIGS. 1–7. The sleeves 111 and 113 are telescoped into the pipe sections 81 and 85 and the free end 82 of the section 81 deflected laterally to receive in the end thereof the spigot 95 formed on the end of the tube 93. The spigot section 95 is inserted in the pipe section 81 as shown in FIG. 8. This insertion may be achieved by utilizing a tool similar to that described with respect to FIGS. 5 and 6. One such tool which has been found satisfactory for this task is one sold under the trademark HYDROPRESS by R. W. Lyall & Company, Inc., 9837 Pioneer Blvd., Santa Fe Springs, Calif. Such tool may include a vice like body having a lead screw or hydraulic piston (not shown) for drawing a clamp and a fork toward one another. The fork may be fitted in the groove 94 between the flanges 90 and 92 and the clamp clamped to the pipe 81 at a location spaced from the extremity thereof. The hydraulic cylinder may then be activated to draw the clamp and fork together thus driving the spigot 95 into the end of such tube 81 until it reaches the position shown in FIG. 9. It will be appreciated that as the spigot 95 is driven into the pipe section 81 the wall of such section will be expanded radially outwardly to a diameter dictated by the diameter of such spigot and the wall thickness of the pipe 81. Once the spigot 81 has been driven sufficiently deep into the pipe section 81 to draw the end of the opposite spigot 101 clear of the pipe 83, the pipe section 81 may be flexed into axial realigned with the pipe section 85 as shown in FIG. 10. The tool may then be reversed to reverse the fork in the groove 94 and to clamp the tube 85 at a location spaced a sufficient distance from the end thereof so as not to interfere with expansion of the tube as the spigot 101 enters rotation of tube lead screw or actuation of the hydraulic pump will then serve to draw the clamp and fork together thus drawing the spigot 101 into the end of the pipe 85 while overcoming the retention forces tending to resist withdrawal of the spigot 95 to draw it sufficiently from the pipe section 81 to reach the position shown in FIG. 10. It has been discovered that for pipes under about 1¾ inches O.D. frusto-conical sealing rings of the configuration shown will allow for a sufficient degree of manipulation to permit joining of the pipe sections 81 and 85 in this manner. For two inch O.D. plastic pipes and larger, it is preferrable to flatten the crowns 82 formed at the major diameters or such sealing rings as shown in FIG. 8 to facilitate partial retraction or withdrawal from the tube 81 as depicted in the step from FIG. 8 to FIG. 9.

After the spigots 95 and 100 have been so inserted, the finishing sleeves 111 and 113 may then be drawn axially toward the repair fitting 91 to position such sleeves in surrounding relationship on the respective spigots 95 and 101 to compress the wall of the respective plastic pipe sections 81 and 85 radially inwardly into sealing engagement with the respective sealing rings 97 and 103 as described above in connection with FIGS. 1–8. Consequently, such repair coupling 91 provides an economical and efficient means for repairing a damaged plastic pipe in a secure and reliable manner.

From the foregoing it will be apparent that the plastic pipe coupling apparatus of the present invention provides a straight forward method for coupling plastic pipes together. The coupling apparatus may be installed in a short period of time by relatively unskilled personnel and requires only relatively inexpensive and uncomplicated clamping tools which are readily available and convenient to operate. The saw tooth shape of the ribs and grooves, as viewed in cross section, forming the exterior of the spigots act as barbs to cooperate with the body of the mating pipe sections, as flowed thereabout by the compression of the finishing sleeve, to form a mechanical connection having a high degree of integrity and capable of withstanding high tensile and bending forces.

Various modifications and changes may be made with regard to the foregoing detailed description without departing from the spirit of the invention.

I claim:

1. A plastic gas pipe coupling system comprising:
    at least one plastic pipe having predetermined inside and outside diameters and formed by a wall constructed of relatively rigid plastic material flowable at ambient temperature under a predetermined compressive pressure;
    a plastic fitting formed with an annular wall defining a through axial bore and including circular flange means defining at least a first flange member having a compressive tool abutment surface, said circular flange means having at least a first spigot projecting axially therefrom, the outer periphery of said spigot being formed with a minor diameter and a plurality of, axially spaced apart, frusto-conically shaped sealing rings radiating outwardly from said minor diameter to a major diameter, each arranged to taper rearwardly toward said flange member and radially outwardly to form respective conical wedge surfaces and then breaking inwardly to form respective annular stop faces, said wedge surfaces and annular stop faces cooperating, in cross-section, to form saw tooth shaped grooves;
    a plastic completion sleeve for telescopical receipt on said pipe to be telescoped into coaxial relationship with said spigot;

said sealing rings being sized to be received telescopically into the extremity of said plastic pipe to wedge the wall of said pipe to a radially expanded configuration, said sleeve being characterized in that it is formed with an interior diameter sufficiently smaller than the exterior diameter of said expanded configuration of said pipe and possesses sufficient tensile strength to cause it, when telescoped along said pipe and onto said expanded configuration of said pipe at ambient temperatures to maintain said interior diameter and thereby press the wall of said pipe radially inwardly under a pressure at least as great as said predetermined compressive pressure to cold flow the plastic of the wall of said pipe radially inwardly into said saw tooth shaped grooves to maintain the wall of said pipe compressed in sealing, coaxial, engagement with said grooves and sealing rings; and a support tube telescopically received in said bore and cooperating with the wall of said spigot to support such spigot wall against radial inward collapse as said predetermined compressive pressure is applied to said expanded configuration of said pipe pressing it radially inwardly on said spigot.

2. A plastic coupling as set forth in claim 12 wherein: said support tube is constructed to aluminum.

3. A plastic coupling as set forth in claim 1 wherein: said spigot is formed on its extremity remote from said flange with a stress relief nipple having a diameter smaller than the predetermined inside diameter of said pipe for slip fit thereonto.

4. A plastic coupling as set forth in claim 1 wherein: said sleeve is constructed of high impact resistant plastic.

5. A plastic coupling as set forth in claim 1 wherein: said fitting is constructed of high impact resistant plastic.

6. A plastic coupling as set forth in claim 1 wherein: said fitting is formed with a second spigot substantially identical in configuration to said first spigot but projecting axially from the side of said flange means opposite the side on which said first spigot is located to form a double end.

7. A plastic couping as set forth in claim 1 wherein: said sealing rings are formed on their major diameters with flattened crowns.

8. A plastic coupling as set forth in claim 6 wherein: said fitting is formed with a second flange spaced axially from said first flange means to form therebetween an annular groove.

9. A plastic coupling as set forth in claim 1 wherein: said spigot is formed with an enlarged diameter centering land interposed between said first flange and said sealing rings for telescopical receipt thereover in close fitting relation ship of one end of said completion sleeve.

10. A plastic coupling as set forth in claim 1 for use with plastic pipe constructed of polyethylene and wherein:
said sealing rings and completion sleeve are so configured as to cause said completion sleeve, when drawn onto said expanded configuration of said pipe, to develop a compressive pressure at least as great as the pressure at which said polyethylene flows at ambient temperature.

11. A plastic coupling as set forth in claim 1 wherein: said support tube is constructed of electrically conductive metal; and said fitting and spigots fully encase the exterior of said tube to electrically insulate it from the exterior of said fitting.

12. A plastic gas pipe coupling system comprising:
a pair of plastic pipes formed by walls having predetermined inside and outside diameters and constructed of relatively rigid plastic, flowable at ambient temperature, under a predetermined compressive pressure;

a double ended plastic fitting formed with a through axial bore including central flange means and having first and second spigots projecting oppositely therefrom, each spigot being formed with a minor diameter and a plurality of axially spaced apart frusto-conically shaped sealing rings radiating outwardly from said minor diameter to respective major diameters sufficiently large to, when said pipes are telescoped thereover, expand said walls thereof radially outwardly to an expanded pipe configuartion, said sealing rings defining therebetween annular grooves, said central flange means having a flange member defining a compressive tool abutment surface;

a pair of plastic completion sleeves for telescopical receipt onto said pipes to be positioned in co-axial relationship over said expanded extremities of said pipes, said sleeves having sufficient tensile strength and being formed with interior bores having a diameter sufficiently smaller than the exterior diameter of said expanded configuration of said pipe and sufficient to cooperate with said sealing rings, when said sleeves are forced telescopically over said expanded extremities of said plastic pipes, to maintain said diameter and compress the plastic walls of said respective pipes radially inwardly under a pressure at least as great as said predetermined pressure to flow the plastic of the walls of said respective pipes radially inwardly into said grooves and to hold said plastic of said walls compressed in said grooves to maintain the walls of said pipe compressed in sealing engagement with said grooves and sealing rings; and a support tube telescoped into said bore to project into said spigots and having sufficient compressive strength to, when said predetermined pressure is applied to said walls of said pipes in said expanded pipe configuration, support the walls of said spigots against radial inward collapse.

13. A plastic gas pipe coupling as set forth in claim 16 for use in coupling together the ends which remain after a short segment of an underground pipe has been removed to leave a space and wherein:
one of said spigots is longer than the other so it may be inserted fully into one of said pipe ends and then partially withdrawn therefrom as the other spigot is inserted in the other pipe end of said pipe ends.

14. A plastic gas pipe coupling system comprising:
a pipe formed by a wall constructed of plastic flowable at ambient temperature under a predetermined compressive pressure;

a fitting constructed of electrically insulative plastic and including a flange defining a compressive tool abutment surface and an elongated spigot projecting therefrom to terminate in a distal end, said spigot being formed on its exterior periphery with a plurality of longitudinally spaced conically shaped sealing rings which taper radially outwardly toward said flange, said sealing rings being so configured as to, when said pipe is telescoped thereto, expand said wall to a predetermined radially expanded pipe configuration;

an electrically insulating plastic sleeve formed with an interior diameter sufficiently smaller than the exterior diameter of said expanded pipe configuration and telescopable over said pipe and being constructed to present sufficient resistance to radial outward expansion, so that as said sleeve is telescoped longitudinally along said pipe into a position coaxially on said spigot over said expanded configuration, it will maintain said interior diameter and apply a radially inward deforming compressive pressure to such expanded pipe wall of a magnitude at least equal to said predetermined compressive pressure to flow the plastic of said wall radially inwardly about said sealing rings to form a seal between said wall and spigot while forming a mechanical connection therebetween; and a support tube telescoped into said spigot and having sufficient resistance to radial collapse to cooperate with the wall of said spigot to support such wall against radially inwardly collapse under said deformine compressive force whereby said support tube is electrically insulated from the exterior of said fitting.

15. A plastic gas pipe coupling system according to claim 14 wherein:
said pipe is constructed of polyethylene.

16. A plastic gas pipe coupling system according to claim 14 wherein:
said tube is constructed of electrically conductive metal.

17. A plastic gas pipe coupling system according to claim 14 wherein:
said fitting is contruced of high impact resistant plastic.

18. A plastic gas pipe coupling system according to claim 14 wherein:
said sleeve is constructed of high impact resistant plastic.

19. A plastic gas pipe coupling system according to claim 17 wherein:
said tube is constructed of metal.

20. A plastic gas pipe coupling system according to claim 17 wherein:
said sleeve is constructed of high impact resistant plastic.

21. A plastic pipe coupling system to claim 15 wherein:
said fitting and sleeve are constructed of high impact resistant plastic.

* * * * *